US006374465B1

(12) United States Patent
Dykstra

(10) Patent No.: US 6,374,465 B1
(45) Date of Patent: Apr. 23, 2002

(54) PULL ACTION CLAMP MECHANISM

(75) Inventor: Henry Dykstra, Hartland, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/636,624

(22) Filed: Aug. 11, 2000

(51) Int. Cl.[7] .......................... A44B 21/00; B66F 3/00; B23Q 3/02

(52) U.S. Cl. .................. 24/68 T; 24/68 CD; 24/68 SK; 24/71 SK; 24/909

(58) Field of Search ............................ 24/68 T, 68 CD, 24/71 SK, 68 SK, 68 CT, 68 D

(56) References Cited

U.S. PATENT DOCUMENTS 2,832,446 A * 4/1958 Smith et al. ............. 24/68 CD
4,407,493 A * 10/1983 Okolischan .................. 269/93
4,422,218 A * 12/1983 Brasseux ................. 24/68 CT
4,493,133 A * 1/1985 Nilsson ...................... 24/68 T
4,651,392 A * 3/1987 Olivieri .................... 24/71 SK
5,083,350 A * 1/1992 Sandreid ................... 24/134 R
5,165,148 A * 11/1992 Fleischer et al. ........ 24/68 CD
5,586,367 A * 12/1996 Benoit ..................... 24/68 SK

FOREIGN PATENT DOCUMENTS

FR 0590033 * 6/1925 ................ 24/68 D

OTHER PUBLICATIONS

The World of Clamping, DE–STA–CO Industries 1998, pp. 37–38.

* cited by examiner

*Primary Examiner*—Victor N. Sakran
(74) *Attorney, Agent, or Firm*—Dinnin & Dunn, P.C.

(57) ABSTRACT

A controlled U-hook pull-action clamp mechanism comprising, an elongated actuator member having a first pivot pin at one end thereof, and an operating portion generally located at the other end thereof, said actuator member being movable between open and closed positions to open or close the clamp mechanism, a link member attached near one end thereof via a second pivot pin to a mid-part location on said actuator member, a slidable pivot member attached to a second end of said link member, a U-shaped clamp member, with the ends of said clamp member being attached to the outer ends of the slidable pivot member, a base member, having a slide aperture therein within which said slidable pivot member is movable in back and forth directions to activate the U-shaped clamp from a closed clamped condition to an open unclamped condition.

11 Claims, 4 Drawing Sheets

FIG. 1.
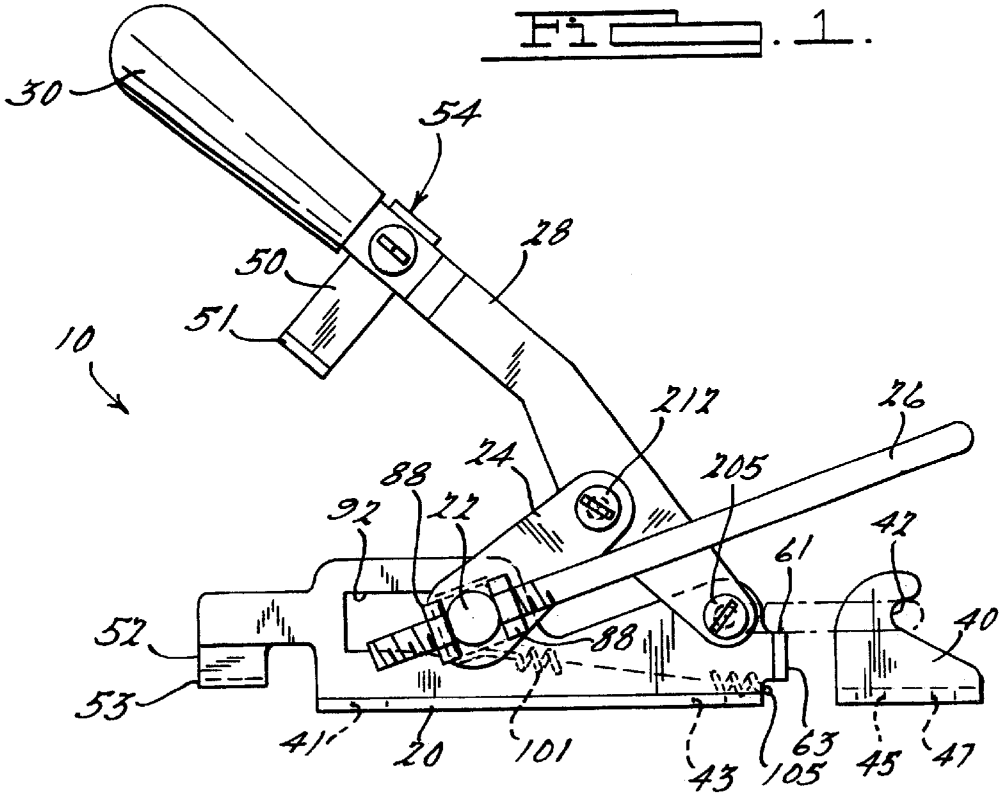
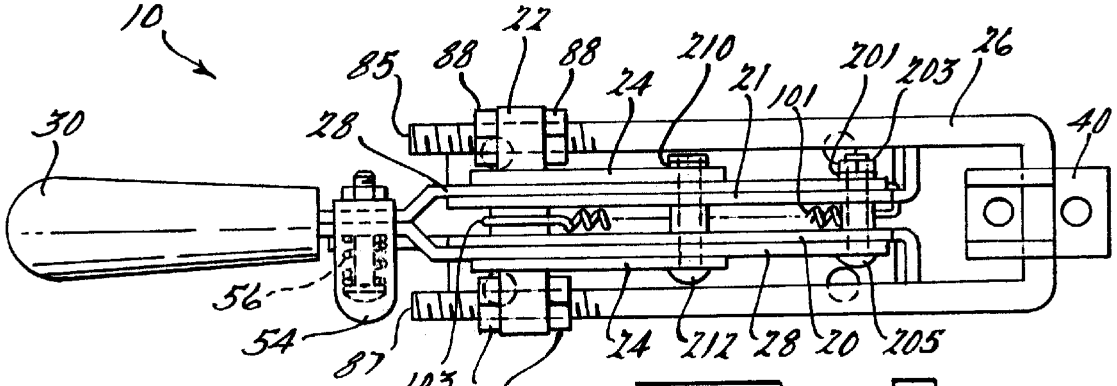
FIG. 2.
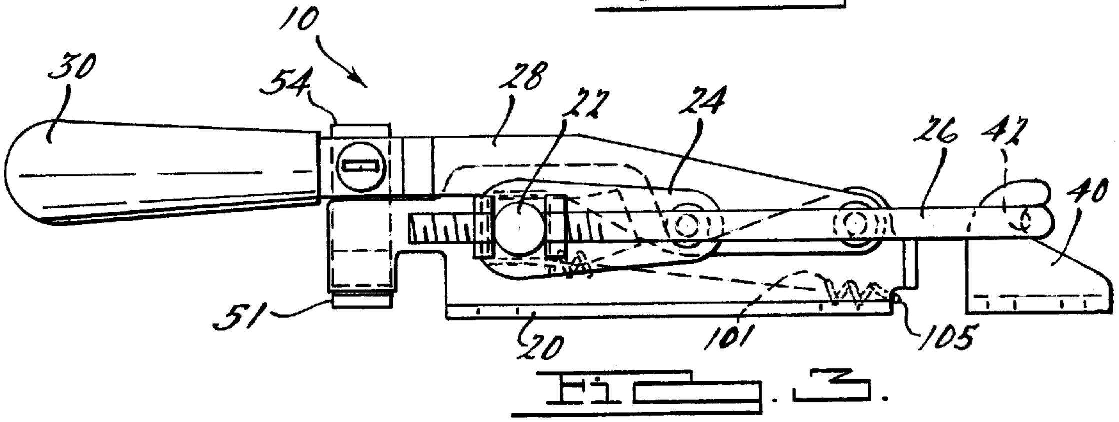
FIG. 3.

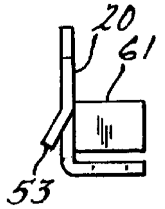
FIG. 5.
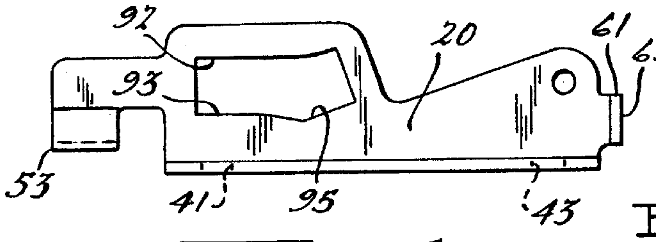
FIG. 4.
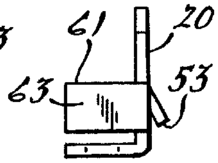
FIG. 6.
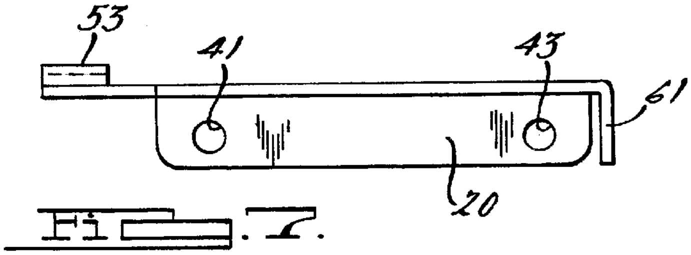
FIG. 7.
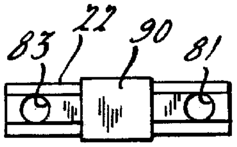
FIG. 8.
FIG. 9.
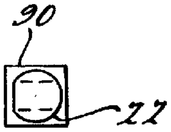
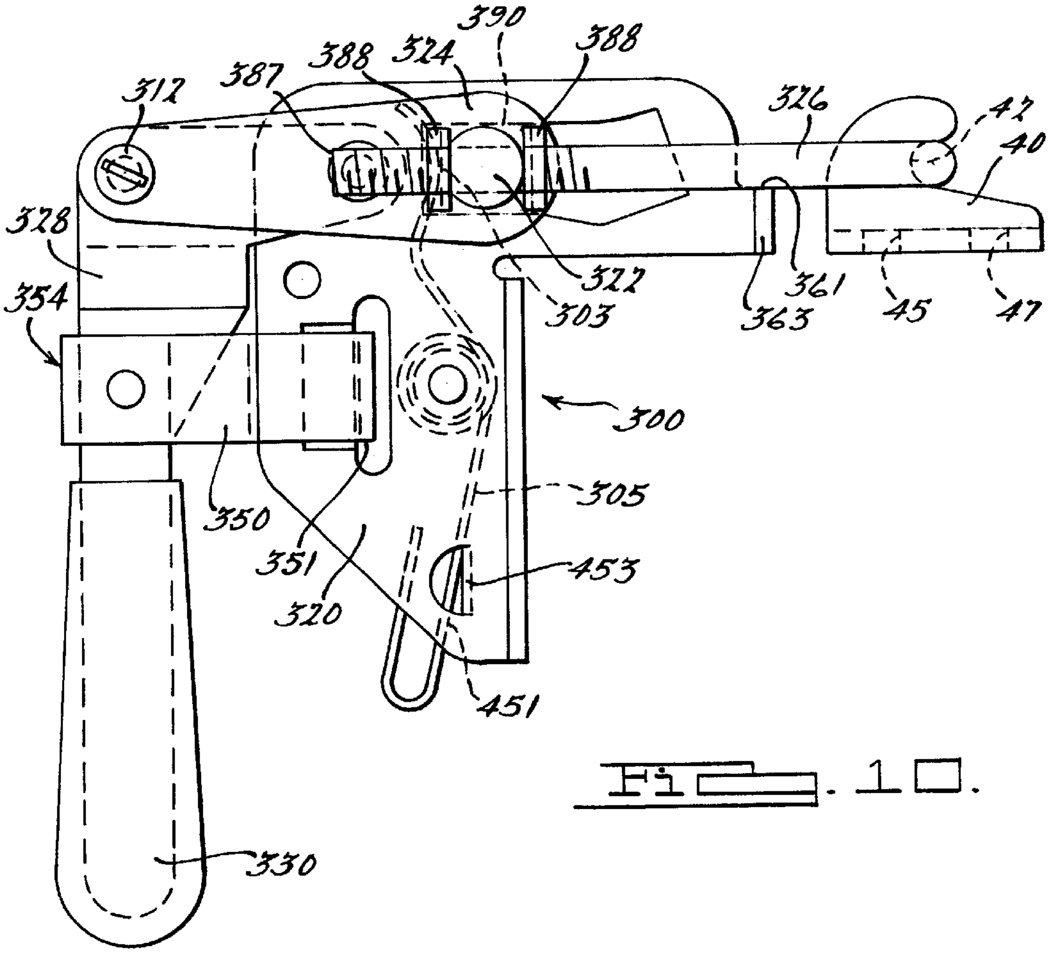
FIG. 10.

PULL ACTION CLAMP MECHANISM

BACKGROUND OF THE INVENTION

This invention broadly relates to new pull action clamp mechanism. More particularly, the invention relates to a controlled U-hook clamp mechanism which has a special linkage system to provide unique advantages over the prior art.

The prior art is exemplified by De-Sta-Co Industries clamp (Madison Heights, Mich.) Model 331, Model 341 and Model 344.

It is an object of the present invention to provide a new clamp mechanism which has a much lower closed clamped profile relative to prior art clamping mechanisms.

Another object of this invention is to provide a clamping mechanism which automatically holds itself in an open or upward position when released from the fully clamped position.

Another object of the invention is to provide a clamping mechanism which can be operated not only manually, but which can be power operated if desired through the use of a hydraulic or pneumatic cylinder.

Another object of the invention is to provide a new pull action clamp mechanism which when in the locked position provides a slightly over center stop position which biases the clamping mechanism into a locked fully clamped position.

Another object of the invention is to provide a new clamp mechanism capable of one-handed operation.

Another object of this invention is to provide a pull action clamp mechanism which can have a 90% or right angle type construction such that the clamping mechanism will be operative around a comer.

Another object of the invention is to provide a pull action clamp mechanism which is capable of initial adjustments prior to locking the clamp in place, which is enabled through the use of special fasteners or other positioning members at the back of the U-hook clamp.

Another object of the invention is to provide a new clamping mechanism which can also be operated as a J-hook clamp as well.

Other objects, features, and advantages of the present invention will become apparent from the subsequent description, and the appended claims, taken in conjunction with the accompanying drawings.

BRIEF DESCRIPTION OF THE DRAWINGS

FIG. 1 illustrates a side view of a preferred embodiment of the pull action clamp mechanism of the invention shown in open position;

FIG. 2 illustrates a top view of the clamp mechanism of FIG. 1;

FIG. 3 illustrates a side view of the clamp mechanism of FIG. 2, shown in closed locked clamped position;

FIG. 4 illustrates a side view of the base member of FIG. 1;

FIG. 5 illustrates a left end view of FIG. 4;

FIG. 6 illustrates a right side view of the base member of FIG. 4;

FIG. 7 illustrates a top view of FIG. 4;

FIG. 8 illustrates a view of the slide member used in FIG. 1, and to which the ends of the U-hook are attached;

FIG. 9 illustrates a side view of FIG. 8;

FIG. 10 illustrates another embodiment of the invention wherein the clamp is constructed such that it is of 90% or right angle configuration to be placed around a comer mount;

SUMMARY OF THE INVENTION

Figure 11:
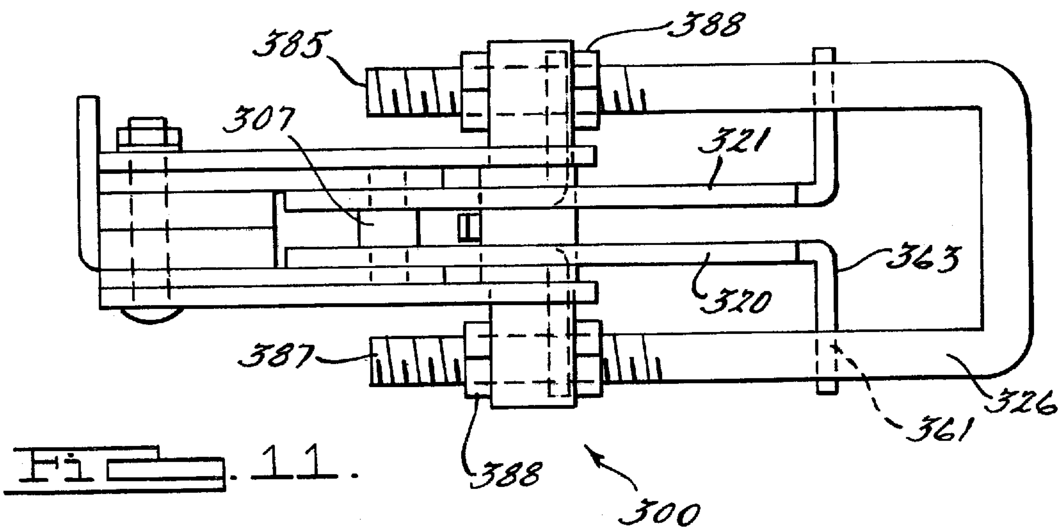
FIG. 11 illustrates a top view of FIG. 10.

A controlled U-hook pull-action clamp mechanism comprising, an elongated actuator member having a first pivot pin at one end thereof, and an operating position generally located at the other end thereof, said actuator member being movable between open and closed positions to open or close the clamp mechanism, a link member attached near one end thereof via a second pivot pin to a mid-part location on said actuator member, a slidable pivot member attached to a second end of said link member, a U-shaped clamp member, with the ends of said clamp member being attached to the outer ends of the slidable pivot member, a base member, having a slide aperture therein within which said slidable pivot member is movable in back and forth directions to activate the U-shaped clamp from a closed clamped condition to an open unclamped condition. In the present invention there is provided a much lower closed clamped profile which is highly advantages in numerous applications.

DESCRIPTION OF THE PREFERRED EMBODIMENTS OF THE INVENTION AND THE BEST MODE

The invention is now described with reference to the drawings, wherein like numerals in different drawing figures indicate like elements.

FIGS. 1, 2 and 3 show a preferred embodiment of the pull action clamp mechanism 10. The clamp mechanism 10 is comprised of a right hand base member 20, a left hand base member 21, a slidable pivot member 22, a link member 24, a U-shaped clamp member 26, and an elongated actuator member 28, having an operating portion or handle 30 at one end thereof. When the handle or operating portion 30 is depressed from the position shown in FIG. 1, then the U-shaped clamp member 26 is gradually moved downwardly and inwardly to press against the stop member 40 and thereby locks the clamp mechanism into a locked position by pressure of the U-shaped clamp 26 against the stop surface 42 of the stop member 40.

When the handle or operating portion 30 is fully depressed such that the clamp mechanism is in locked position, then the lock member 50 engages the latch 52 which extends from the base member 20 to thereby hold the clamp mechanism 10 in closed position. In order to release the lock 50 from the latch portion 52, one uses a thumb or finger to depress the spring loaded member 54 (see FIG. 2), which thereby rotates the lock member 50 against the biasing action of the spring 56 to release the lock member 50 from its holding action against the latch surface 52, which thereby enables the handle 30 to be raised to release the clamp mechanism 10. The end of the lock member 50 has a small inwardly curved or L-shaped portion 51 which catches against the mating latch surface 53 on the left end of the base member 20. Surface 53 is more clearly visible in the end view of FIG. 5, which shows a side view of the base member 20.

Another unique feature of the clamp mechanism 10 is that the U-shaped clamp 26 and the base member 20 are provided with a level-stop surface 61 (see FIG. 1 or FIG. 4). This stop surface 61 on the flange member 63 is important and certifies that the U-hook 26 is at a proper level to mate with the clamp surface 42 when the clamp mechanism is brought into a closed or locked position by lowering the handle 30.

The slidable pivot member 22 (see FIG. 1) is also uniquely important to the invention. This slidable pivot member 22 is also shown in FIG. 8, and it contains two apertures 81 and 83 which the end portions 85 and 87 of the U-hook 26 pass through. The end portions 85, 87 of the U-hook 26 are threaded such that the positioning of the U-hook clamp member 26 can be threadably adjusted for initial positioning against the stop surface 42 through usage of the threaded nuts 88 (see FIG. 2). The slidable pivot member 22 also includes a square centrally located cross-section portion designated 90 (see FIG. 8); and this square portion 90 fits within and slidably moves back and forth within the elongated channel or aperture 92 (see FIG. 4). The movement of the square portion 90 of the slidable pivot member within the channel 92 acts to uniquely move and locate the clamp member 26. This occurs as the square portion 90 slides along the first area 93 of the channel 92 (see FIG. 4), and such that when the square portion 90 reaches the area 95 of the channel 92 then the square portion is rotated as it slides up the surface 95 such that the U-hook clamp 26 is also rotated upwardly and away from the stop portion 42 (shown in FIG. 1). The frictional engagement of the square portion 90 with the surface of the channel 92 also permits causes the clamp member 26 to be held in an open-upward position when the handle 30 is gradually opened and lifted to the full open position shown in FIG. 1. However, as an alternative technique to insure that the clamp member 26 will be held in the open position, it is also possible to use a spring member 101 which acts to bias the slidable pivot member 22 into an open position through the action of the spring member 101 against the slide member 22 at the point designated 103 (see FIG. 2). The spring 101 is connected to the slide member at 103 on one end, and at its opposite end at the point 105 (see FIG. 3).

The clamp mechanism 10 can also be held in a full open position (as shown in FIG. 1) through the use of a friction washer 201 (e.g., see FIG. 2) which is placed underneath a threaded nut 203 which attaches a fastener 205 in position to hold the pivoting end of the elongated actuated member 28 in position. The same type of a friction washer 210 (see FIG. 2) can be used on the fastener 212 which holds one end of the link member 24 in pivoting relationship to the actuator member 28. Thus, when the friction washers 201, 210 are used, if desired, the necessity of a spring member 101 need not be included in the mechanism.

The apertures 41, 43 and 45, 47 (see FIG. 1) are for holding the base members and stop members in place on a substrate or surface to which the clamp mechanism 10 is attached.

Figure 12:
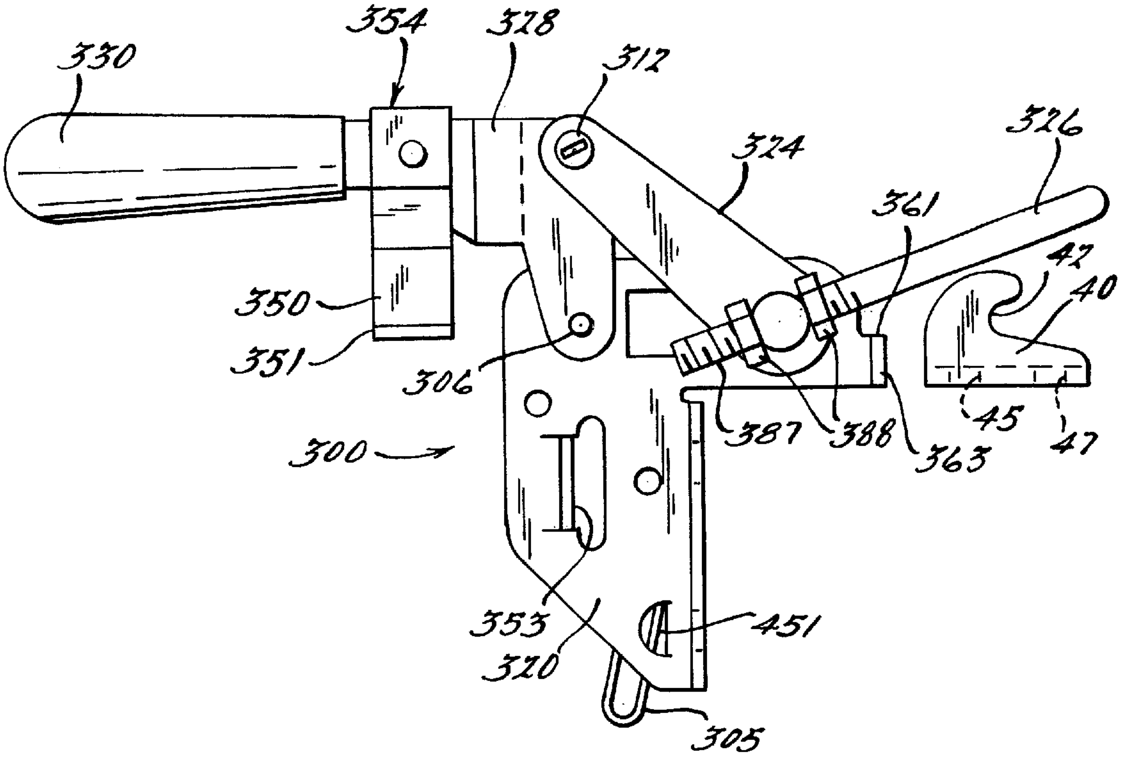
FIG. 12 shows a side view of the 90% clamp mechanism of FIG. 10, but with the clamp mechanism being in open position.

FIGS. 10, 11 and 12 show another embodiment of the clamp mechanism designated 300 which is designed to have 90 degree configuration and can fit around a comer type location. Clamp mechanism 300 is comprised of a right hand base member 320, a left hand base member 321, a slidable pivot member 322, a link member 324, a U-shaped clamp member 326, and an elongated actuator member 328, having an operating portion or handle 330 at one end thereof. There is also a 1-piece machined pin 307 (FIG. 11), which properly locates the actuator arm 328 for pivoting movement about the pin 306.

When the handle or operating portion 330 is depressed from the position shown in FIG. 12, then the U-shaped clamp member 326 is gradually moved downwardly and inwardly to press against the stop member 40 and thereby locks the clamp mechanism into a locked position by pressure of the U-shaped clamp 26 against the stop surface 42 of the stop member 40 (see FIGS. 10 and 12).

When the handle or operating portion 330 is fully depressed such that the clamp mechanism is in locked position, then the lock member 350 engages the latch 353 which extends from the base member 320 to thereby hold the clamp mechanism 300 in closed position. In order to release the lock 350 from the latch 353 one uses a thumb or finger to depress the spring loaded member 350 (see FIGS. 10 and 12) which operates in a similar fashion as lock member 54 (in FIGS. 1–3). Depression of lock portion 354 thereby rotates the lock member 350 against the biasing action of a spring (not shown) to release the lock member 351 from its holding action against the latch surface 353 (FIG. 12), which thereby enables the handle 330 to be raised to open the clamp mechanism 300. The end of the lock member 350 has a small inwardly curved or L-shaped portion 351 which catches against the mating surface 353 on the base member 320 (FIG. 12).

It is also a unique feature of the clamp mechanism 300 that the U-shaped clamp 326 and the base member 320 are provided with a level-stop surface 361 (see FIG. 10 or FIG. 12). This stop surface 361 on the flange member 363 is important and certifies that the U-hook 326 is at a proper level to mate with the clamp stop surface 42 when the clamp mechanism 300 is brought into a closed or locked position by lowering the handle 330.

Figure 13:
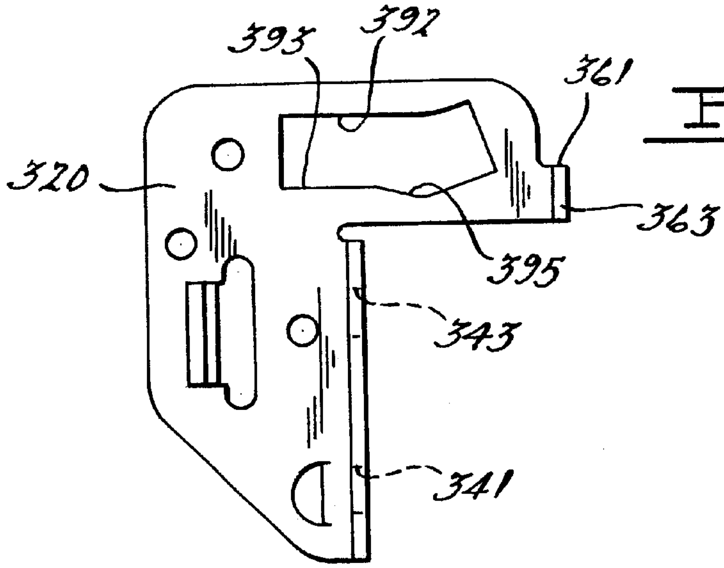
FIG. 13 illustrates a side view of the base member used in the clamp mechanism of FIG. 10.
Figure 14:
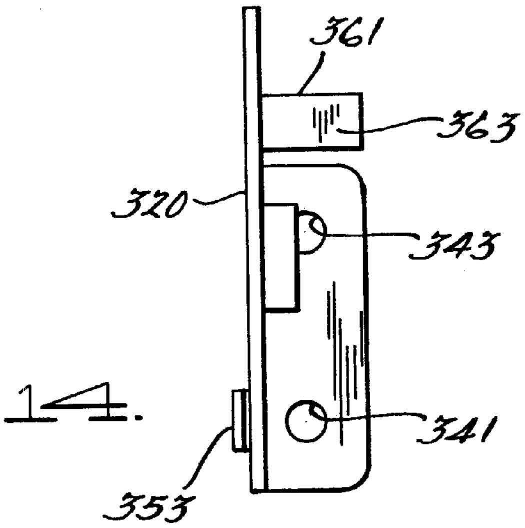
FIG. 14 illustrates a left side view of FIG. 13.
Figure 15:
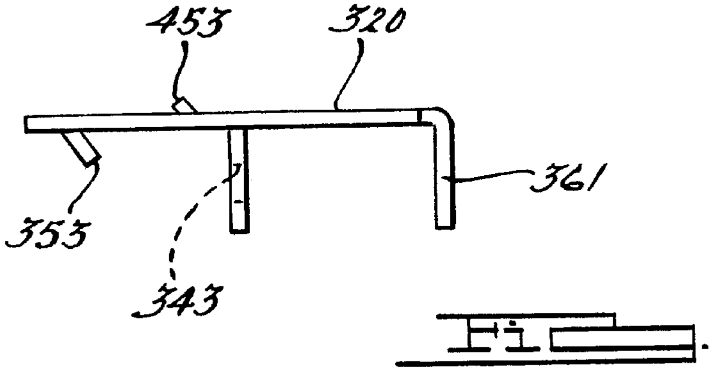
FIG. 15 illustrates a top view of FIG. 13.

The slidable pivot member 322 (see FIG. 10) is also uniquely important to this embodiment of the invention. This slidable pivot member 322 is of the same type also shown in FIG. 8, and it contains two apertures 81 and 83 which the end portions 385 and 387 of the U-hook 326 pass through. The end portions 385, 387 of the U-hook 326 are threaded such that the positioning of the U-hook clamp member 326 can be threadably adjusted for initial positioning against the stop member 40 through usage of the threaded nuts 388 (see FIG. 10). The slidable pivot member 322 also includes a square centrally located cross-section portion designated 390 (see FIG. 10); and this square portion 390 fits within and slidably moves back and forth within the elongated channel or aperture 392 (see FIG. 13). The movement of the square portion 390 of the slidable pivot member within the channel 392 acts to uniquely move and locate the clamp member 326. This occurs as the square portion 390 slides along the first area 393 of the channel 392 (see FIG. 13), and such that when the square portion 390 slides across the area 395 of the channel 392 then the square portion is rotated as it slides up the surface 395 such that the U-hook clamp 326 is also rotated upwardly and away from the stop portion 42 (shown in FIG. 12). The frictional engagement of the square portion 390 with the surface of the channel 392 also permits or causes the clamp member 326 to be held in an open-upward position when the handle 330 is gradually opened and lifted to the full open position shown in FIG. 12. Alternatively, in order to insure that the clamp member 326 will be held in the open position, it is possible to use a spring member 305 which acts to bias the slidable pivot member 322 into an open position through the action of the spring member 305 against the slide member 322 at 303 (see FIG. 10). The spring 305 is connected to the slide member at 303 on one end, and at its opposite end 451 it is held against the flange 453 (see FIG. 10).

The clamp mechanism 300 can also be held in a full open position through the use of a friction washers (not shown) as used in the embodiment of FIG. 2. The same type of a friction washers could be used on the fastener 312 which holds one end of the link member 324 in pivoting relationship to the actuator number 328 (see FIG. 12). Thus, when friction washers are used, if desired, the necessity of a spring member 305 need not be included in the mechanism.

The technical advantages and unique benefits of the invention, will be apparent from the descriptions given above and are now to be discussed. (1) The path control available by the special linkage movement of the U-hook and its availability of being operated in a single handed fashion provide a unique technical advance over prior clamping mechanisms used in the past. (2) The clamp mechanism described herein gives a much lower closed clamp profile; and, a lower profile for the closed clamp can be extremely advantageous in many application uses. (3) Also the clamp mechanism disclosed is extremely efficient in operation, and the time necessary to operate, i.e., open and close the clamp is minimal compared to most other clamps in the prior art. (4) The clamping mechanism of this invention enables the clamping member to be held in an open or upward position through the use of friction washers, a spring, or the friction action of the square shaped slidable pivot member, and this is highly advantageous in clamping operations. (5) The clamp mechanism described herein can be power operated as well, through the use of a hydraulic cylinder or pneumonic cylinder fastened between the substrate or base area and the operating arm 28. (6) The clamping mechanism (through the use of drilled holes) can be locked in the closed position through the use of a padlock or other lock members, besides the lock member 50 shown in FIG. 1. (7) The clamping mechanism can also include plastic and/or metal washers as the lock washers to cause the clamping mechanism to stay in the open position once the operating arm 28 or the operating arm 330 are raised to open the clamp. (8) Alternatively, a spring member can be used to cause the clamp mechanism of the invention to be held in a full open position. (9) A slight over center lock action is built into the linkage system such that when the mechanism is clamped and the links move over center, the locking action is firm and secure. (10) The clamp mechanism of the invention is also not limited to just being used in a 180° or flat configuration versus a 90° or around a comer configuration; that is, the clamp could be used in any angular configuration between 90° and 180° by simply adjusting the elements used to construct the clamp. (11) The threaded nuts at the back of the U-hook enable initial adjustments of the U-hook clamp to be made such that once the adjustment is made there will be a firm locking action of the U-hook 26 against the stop surface 42. (12) As noted above the clamp mechanism of the invention could also be constructed in a J-hook fashion as well, that is, a J-hook could be used instead of a U-hook clamp in the mechanism of the invention. Or alternatively, it could be a T-hook clamping surface with either side (or both sides) of the T being a clamping surface; or it could be a round ball clamping surface, where the ball seats in a socket or other receiving surface to clamp the same; or it could be a threaded end surface to which various clamping members are attached.

While it will be apparent that the preferred embodiments of the invention disclosed are well calculated to fulfill the objects, benefits and/or advantages of the invention, it will be appreciated that the invention will be susceptible to modification, variation and change without departing from the proper scope or fair meaning of the sub-joined claims.

What is claimed is:

1. A controlled U-hook pull-action clamp mechanism comprising, an elongated actuator member having a first pivot pin at one end thereof, and an operating portion generally located at the other end thereof, said actuator member being movable between open and closed positions to open or close the clamp mechanism, a link member attached near one end thereof via a second pivot pin to a mid-part location on said actuator member, a slidable pivot member attached to a second end of said link member, a U-shaped clamp member, with the ends of said clamp member being attached to the outer ends of the slidable pivot member, a base member, having a slide aperture therein within which said slidable pivot member is movable in back and forth directions to activate the U-shaped clamp from a closed clamped condition to an open unclamped condition.

2. The clamp mechanism of claim 1 wherein, said slidable pivot member has a generally rectangular cross-section near the mid-part thereof.

3. The clamp mechanism of claim 1 wherein, a spring member is attached from the slidable pivot member to an opposite and of said base member.

4. The clamp mechanism of claim 1 wherein, said actuator member has a lock member attached thereto.

5. The clamp mechanism of claim 1 wherein, said closed clamped position occurs when a clamp surface on the U-shaped clamp member is pulled tight against an opposing clampable surface.

6. The clamp mechanism of claim 1 wherein, said slidable pivot member has a generally rectangular cross-section near the mid-part thereof, a spring member is attached from the slidable pivot member to an opposite end of said base member.

7. The clamp mechanism of claim 1 wherein, said slidable pivot member has a generally rectangular cross-section near the mid-part thereof, a spring member is attached from the slidable pivot member to an opposite end of said base member, said actuator member has a lock member attached thereto.

8. The clamp mechanism of claim 1 wherein, said slidable pivot member has a generally rectangular cross-section near the mid-part thereof, a spring member is attached from the slidable pivot member to an opposite end of said base member, said actuator member has a lock member attached thereto, said closed clamped position occurs when a clamp surface on the U-shaped clamp member is pulled tight against an opposing clampable surface.

9. A pull action clamp mechanism, comprising, a base member, a slidable pivot member, said slidable pivot member has a generally rectangular cross-section near the mid-part thereof, a spring member attached from the slidable pivot member to an opposite end of said base member, a link member, a U-shaped clamp member, and an elongated actuator member having an operating portion at one end thereof.

10. A pull action clamp mechanism, comprising, a base member, a slidable pivot member, said slidable pivot member has a generally rectangular cross-section near the mid-part thereof, a spring member attached from the slidable pivot member to an opposite end of said base member, a link member, a U-shaped clamp member, and an elongated actuator member having an operating portion at one end thereof, said actuator member has a lock member attached thereto.

11. A pull action clamp mechanism, comprising, a base member, a slidable pivot member, said slidable pivot member has a generally rectangular cross-section near the mid-part thereof, a spring member attached from the slidable pivot member to an opposite end of said base member, a link member, a U-shaped clamp member, an elongated actuator member having an operating portion at one end thereof, said actuator member has a lock member attached thereto, and a closed clamped position occurs when a clamp surface on the U-shaped clamp member is pulled tight against an opposing clampable surface.

* * * * *

UNITED STATES PATENT AND TRADEMARK OFFICE

CERTIFICATE OF CORRECTION

PATENT NO. : 6,374,465 B1

DATED : April 23, 2002

INVENTOR(S) : Henry Dykstra

It is certified that error appears in the above-identified patent and that said Letters Patent is hereby corrected as shown below:

Column 1,
Lines 32 and 66, delete "comer" and insert -- corner --

Column 3,
Line 59, delete "comer" and insert -- corner --

Signed and Sealed this

Twentieth Day of August, 2002

*Attest:*

JAMES E. ROGAN

*Attesting Officer*

*Director of the United States Patent and Trademark Office*